United States Patent
Backstrom et al.

(10) Patent No.: US 6,477,377 B2
(45) Date of Patent: *Nov. 5, 2002

(54) CELLULAR RADIOTELEPHONE SYSTEMS AND METHODS THAT BROADCAST A COMMON CONTROL CHANNEL OVER MULTIPLE RADIO FREQUENCIES

(75) Inventors: Olof Tomas Backstrom, Cary, NC (US); John Mark Freeze, Raleigh, NC (US)

(73) Assignee: Ericsson Inc., Research Triangle Park, NC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 152 days.

(21) Appl. No.: 09/087,357

(22) Filed: May 29, 1998

(65) Prior Publication Data

US 2001/0014608 A1 Aug. 16, 2001

(51) Int. Cl.[7] .................................................. H04Q 7/36
(52) U.S. Cl. .......................... 455/446; 455/434; 455/62
(58) Field of Search ................................ 455/450, 452, 455/453, 454, 434, 509, 513, 62, 515, 446, 59, 502, 503, 422, 63

(56) References Cited

U.S. PATENT DOCUMENTS

| | | | | |
|---|---|---|---|---|
| 4,365,347 A | * | 12/1982 | Otsuka et al. ................. 455/62 |
| 4,490,830 A | * | 12/1984 | Kai et al. ..................... 455/502 |
| 4,570,265 A | * | 2/1986 | Thro ............................ 455/502 |
| 5,088,108 A | | 2/1992 | Uddenfeldt et al. ........... 375/12 |
| 5,257,399 A | * | 10/1993 | Kallin et al. ................ 455/33.1 |
| 5,535,215 A | | 7/1996 | Hieatt, III .................. 370/95.1 |
| 5,546,443 A | | 8/1996 | Raith ............................ 379/59 |
| 5,778,318 A | * | 7/1998 | Talarmo et al. ............. 455/452 |
| 5,970,412 A | * | 10/1999 | Maxemchuk ............... 455/450 |
| 5,974,325 A | * | 10/1999 | Kotzin et al. ............... 455/450 |

FOREIGN PATENT DOCUMENTS

WO  WO 97/13386  4/1997

OTHER PUBLICATIONS

International Search Report, PCT/US99/08331, Jul. 30, 1999.

* cited by examiner

*Primary Examiner*—Lester G. Kincaid
(74) *Attorney, Agent, or Firm*—Myers Bigel Sibley & Sajovec

(57) ABSTRACT

Cellular radiotelephone systems and methods communicate with cellular radiotelephones via multiple base stations. Radiotelephone traffic channels are used by the base stations for radiotelephone communications with the telephones. A common control channel is transmitted by the base stations, to control radiotelephone communications with the radiotelephones over the radiotelephone traffic channels. The common control channel is transmitted by a first one of the base stations over a first radio frequency and is transmitted by a second one of the base stations over a second radio frequency that is different from the first radio frequency. By providing a common control channel, excess control channel capacity can be reduced, thereby conserving control channel radio spectrum. Moreover, by transmitting the common control channel using multiple radio frequencies, the radio frequencies can be selected to reduce and preferably eliminate interference.

36 Claims, 5 Drawing Sheets

CELLULAR RADIOTELEPHONE SYSTEMS AND METHODS THAT BROADCAST A COMMON CONTROL CHANNEL OVER MULTIPLE RADIO FREQUENCIES

FIELD OF THE INVENTION

This invention relates to communications systems and methods, and in particular to radiotelephone communications systems and methods.

BACKGROUND OF THE INVENTION

Cellular radiotelephone systems are commonly employed to provide voice and data communications to a plurality of subscribers. For example, analog cellular radiotelephone systems, such as designated AMPS, ETACS, NMT-450, and NMT-900, have been deployed successfully throughout the world. More recently, digital cellular radiotelephone systems such as designated IS-54B in North America and the pan-European GSM system have been introduced. These systems, and others, are described, for example, in the book titled *Cellular Radio Systems* by Balston, et al., published by Artech House, Norwood, Mass., 1993.

FIG. 1 illustrates a conventional terrestrial cellular telephone communication system 100. The cellular radiotelephone communication system 100 includes one or more radiotelephones 102 communicating with a plurality of cells 104, each of which is served by a base station (BS) 106a–106n. The base stations 106a–106n communicate with a mobile telephone switching office (MTSO) 108. Although only six cells are shown in FIG. 1, a typical cellular network may comprise hundreds of cells, may include more than one MTSO and may serve thousands of radiotelephones.

The cells 104 generally serve as nodes in the communication system 100 from which links are established between radiotelephones 102 and the MTSO 108 by way of the base stations 106a–106n serving the cells 104. Each cell will have allocated to it one or more dedicated control channels 110a–110n, and one or more traffic channels 112a–112n. The radiotelephone traffic channels are used by the base stations for radiotelephone communications (such as voice and/or data communications) with the radiotelephones. The control channels are used by the base stations to control radiotelephone communications with the radiotelephones over the radiotelephone traffic channels. Thus, for example, the control channel may be used to broadcast system information to the radiotelephones and also to send and receive access messages to and from individual radiotelephones. The base stations 106a–106n are connected to the MTSO by a plurality of bidirectional links 114a–114n, which may be hardwired or wireless links. Through the cellular network 100, a duplex radio communication link may be effected between two radiotelephones 102 or between a radiotelephone 102 and a land line telephone user. The base stations 106a–106n handle radio communication between the radiotelephones in the associated cell 104 and the MTSO 108. In this capacity, the base stations 106a–106n function chiefly as a relay station for data and voice signals.

As shown in FIG. 1, the dedicated control channels 110a–100n are generally broadcast using a different radio frequency $F_1$–$F_n$ per cell. The traffic channels 112a–112n are allocated among a plurality of radio frequencies to reduce and preferably eliminate interference using conventional frequency allocation techniques that are well known to those having skill in the art. As also shown in FIG. 1, several cells may be combined into larger groups 120, called paging areas in cellular radiotelephone standard IS-136 or location areas in GSM. The grouped paging areas can reduce the paging and registration loads on the system. Pages to radiotelephones may only be transmitted to the paging area 120 in which the radiotelephone is located. Registration need only take place when a radiotelephone moves between paging areas.

Unfortunately, a cellular radiotelephone system 100 as described in FIG. 1 may have excess control channel capacity in each cell. More specifically, each control channel may have the capacity to control many more radiotelephones than are generally found within the cell. Accordingly, valuable radio spectrum may be wasted.

This wasted control channel radio spectrum may be reduced by distributing a common control channel via many base stations, forming a larger logical cell including many smaller cells around each base station. The common control channel is multicast on the same frequency in every base station. Accordingly, as shown in FIG. 2, cellular radiotelephone system 200 includes radiotelephones 102, cells 104, MTSO 108, traffic channels 112a–112n and links 114a–114n, as was already described in connection with FIG. 1. However, in contrast with FIG. 1, each base station 206a–206n broadcasts the same control channel 210 on the same frequency $F_1$. Thus, a common control channel is transmitted by the base stations to control radiotelephone communications with the radiotelephones over the radiotelephone traffic channels. By using a common control channel on a common frequency $F_1$, excess capacity in the control channel may be reduced.

Unfortunately, it may be difficult to find a frequency $F_1$ that can be used by the common control channel of all the base stations without interference. Interference may occur in conventional cellular radiotelephone systems, as described in connection with FIGS. 1 and 2. Moreover, interference may be exacerbated in Wireless Office Systems (WOS) that are installed in a building to provide cellular radiotelephone communication among cellular radiotelephones that are located in the building. When installing a wireless office system in a building, there may be excess capacity in the control channel. For example, a wireless office system may be designed for installation in offices with up to 450 users. However, the control channel may have a capacity of up to 1000 users. Thus, a common control channel may be preferred to reduce excess capacity. However, it may be difficult to identify a radio frequency that can be used by all of the WOS base stations to transmit the common control channel.

SUMMARY OF THE INVENTION

It is therefore an object of the present invention to provide improved cellular radiotelephone systems and methods.

It is another object of the present invention to provide cellular radiotelephone systems and methods that can reduce excess capacity in the control channel that is transmitted by the base stations.

It is yet another object of the present invention to provide cellular radiotelephone systems and methods that can reduce the excess capacity of the control channel without incurring excessive control channel interference.

These and other objects are provided, according to the present invention, by transmitting a common control channel in a cellular radiotelephone system from a first one of the base stations over a first radio frequency and from a second one of the base stations over a second radio frequency that is different from the first radio frequency. By providing a common control channel, excess control channel capacity can be reduced and preferably eliminated, thereby conserving control channel radio spectrum. Moreover, by transmitting the common control channel using multiple radio frequencies, the radio frequencies can be selected to reduce and preferably eliminate interference.

More specifically, cellular radiotelephone systems and methods according to the invention communicate with a plurality of cellular radiotelephones via a plurality of base stations. A plurality of radiotelephone traffic channels are used by the base stations for radiotelephone communications with the radiotelephones. A common control channel is transmitted by the base stations to control radiotelephone communications with the radiotelephones over the radiotelephone traffic channels. According to the invention, the common control channel is transmitted by a first one of the base stations over a first radio frequency and is transmitted by a second one of the base stations over a second radio frequency that is different from the first radio frequency. The cellular radiotelephone system also preferably comprises a central control channel handler (CCH) that synchronously transmits the common control channel to the plurality of base stations.

In a preferred embodiment of the present invention, the plurality of base stations are Wireless Office Systems (WOS) base stations that are located in a building to provide cellular radiotelephone communication among cellular radiotelephones that are located in the building. The common control channel is transmitted by the base stations in the building to control radiotelephone communications with the radiotelephones in the building over the radiotelephone traffic channels. The common control channel is transmitted by the first one of the base stations in the building over a first radio frequency and is transmitted by a second one of the base stations in the building over a second radio frequency that is different from the first radio frequency.

A first group of base stations may transmit the common control channel over the first frequency, and a second group of base stations may transmit the common control channel over the second frequency. In a wireless office system as described above, the first group of base stations may be located in a first portion of a building, and the second group of base stations may be located in a second portion of the building. Accordingly, a radio frequency for groups of base stations in a building may be selected to reduce and preferably eliminate interference with the cellular system outside the building, while at the same time broadcasting a common control channel over all of the base stations, to reduce excess control channel capacity.

A cellular radiotelephone system may be initialized according to the present invention to allow simultaneous reduction of excess control channel capacity and reduction of interference with external cellular control channels. In particular, a determination is first made as to whether the common control channel can be transmitted from all the base stations over a first radio frequency without interference. If the common control cannot be transmitted from all base stations over the first radio frequency without interference, then at least one of the base stations that cannot transmit the common control channel over the first radio frequency without interference is identified.

A second radio frequency that is different from the first radio frequency is assigned for transmission by the at least one of the base stations so identified. Once initialized, the common control channel is transmitted from all the base stations except for the at least one of the base stations so identified over a first radio frequency. The common control channel from the at least one of the base stations so identified is transmitted over a second radio frequency that is different from the first radio frequency. The steps of determining, identifying and assigning may be repeatedly performed for the second radio frequency and succeeding radio frequencies until all of the base stations can transmit the common control signal without interference.

Initialization according to the invention can be particularly useful in a wireless office system wherein base stations are located in a building and may be subject to interference from other wireless office systems in the building or from a cellular radiotelephone system outside the building. This interference may be difficult to predict in advance. Accordingly, excess control channel capacity can be reduced without the need to incur interference penalties.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 3:
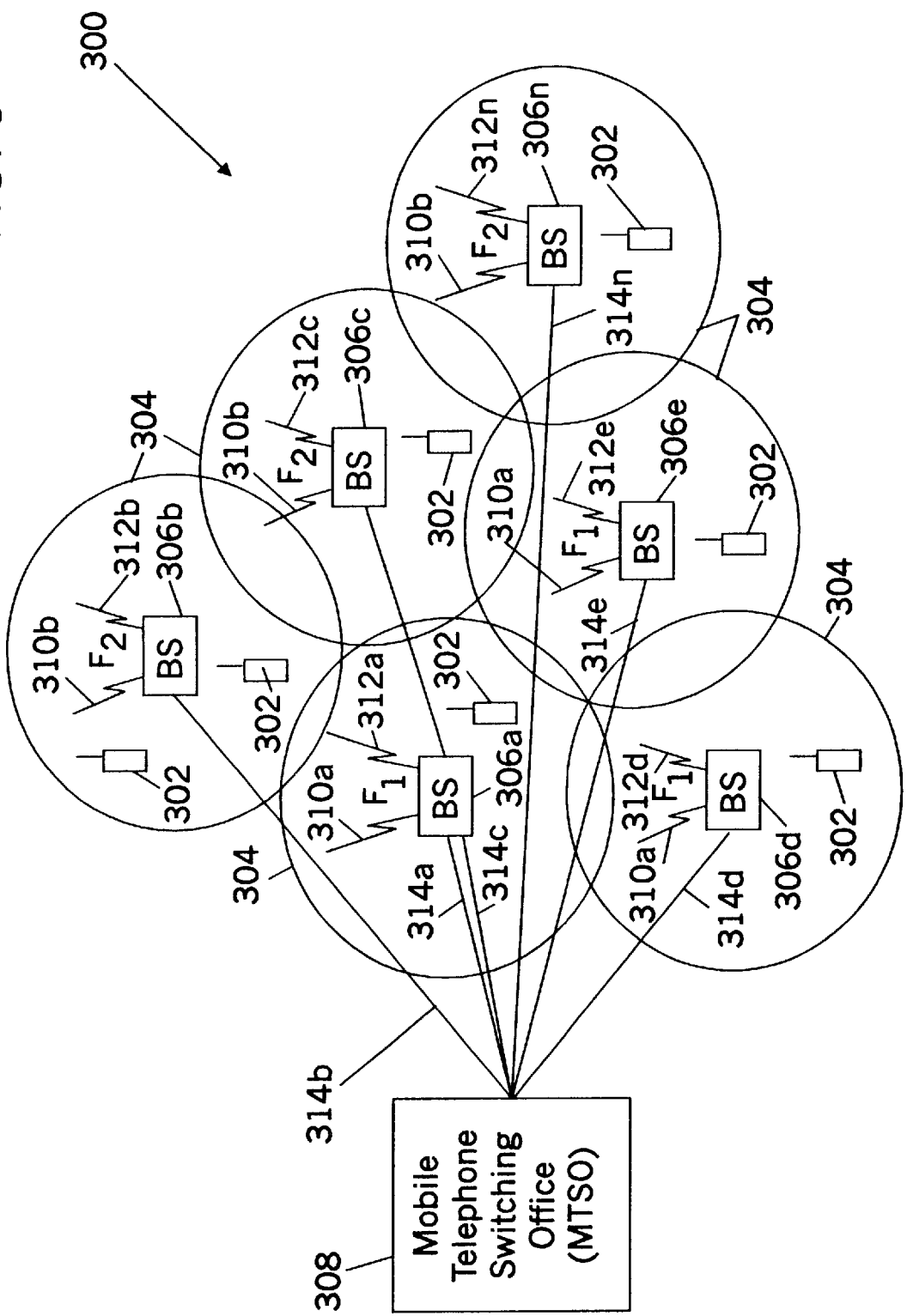
FIG. 3 is a block diagram of first embodiments of cellular radiotelephone communication systems and methods according to the present invention.

Referring now to FIG. 3, cellular radiotelephone systems and methods according to the present invention will now be described. As shown in FIG. 3, a cellular radiotelephone system 300 includes a plurality of radiotelephones 302 in a plurality of cells 304. A plurality of base stations 306a–306n utilize a plurality of radiotelephone traffic channels 312a–312n for radiotelephone communications with the radiotelephones 302. As also shown in FIG. 3, a common control channel is synchronously transmitted from a control channel handler in the MTSO 308 to the base stations and by the base stations to the radiotelephones to control radiotelephone communications with the radiotelephones over the radiotelephone traffic channels. The common control channel is transmitted by a first one of the base stations over a first radio frequency and is transmitted by a second one of the base stations over a second radio frequency that is different from the first radio frequency.

More specifically, as shown in FIG. 3, base stations 306a, 306d and 306e broadcast the common control channel 310a over a first radio frequency $F_1$. The remaining base stations 306b, 306c and 306n broadcast the common control channel 310b over a second radio frequency $F_2$. Accordingly, although all of the base stations 306a–306n broadcast the same common control channel, the base stations are grouped into a first group of base stations (306*a*, 306*d* and 306*e* in FIG. 3) that transmit the common control channel over a first radio frequency $F_1$ and a second group of base stations (306*b*, 306*c* and 306*n*) that transmit the common control signal using a second radio frequency $F_2$.

Since the common control channel is broadcast by all stations 306*a*–306*n*, rather than having a separate control channel for each base station 306*a*–306*n*, excess control channel capacity can be reduced and preferably eliminated. However, since two radio frequencies $F_1$ and $F_2$ are used to transmit the common control channel, interference may be reduced by appropriately assigning the frequencies to the appropriate base station. Thus, even though interference may be created with other cellular systems if all of the base stations are assigned frequency $F_1$ or if all of the base stations are assigned frequency $F_2$ for their common control channel, interference may be reduced and preferably eliminated by splitting the common control channel into two or more radio frequencies.

Cellular radiotelephone system 300 is preferably a microcell or picocell system. In these systems, the distance between the base stations using the same frequency to broadcast the common control channel may be short. Accordingly, the difference in propagation delay may be maintained to less than the minimum propagation delay compensation capability of the mobile radiotelephone, for example using multipath compensation. When larger distances are involved, other compensation schemes may be used.

Figure 4:
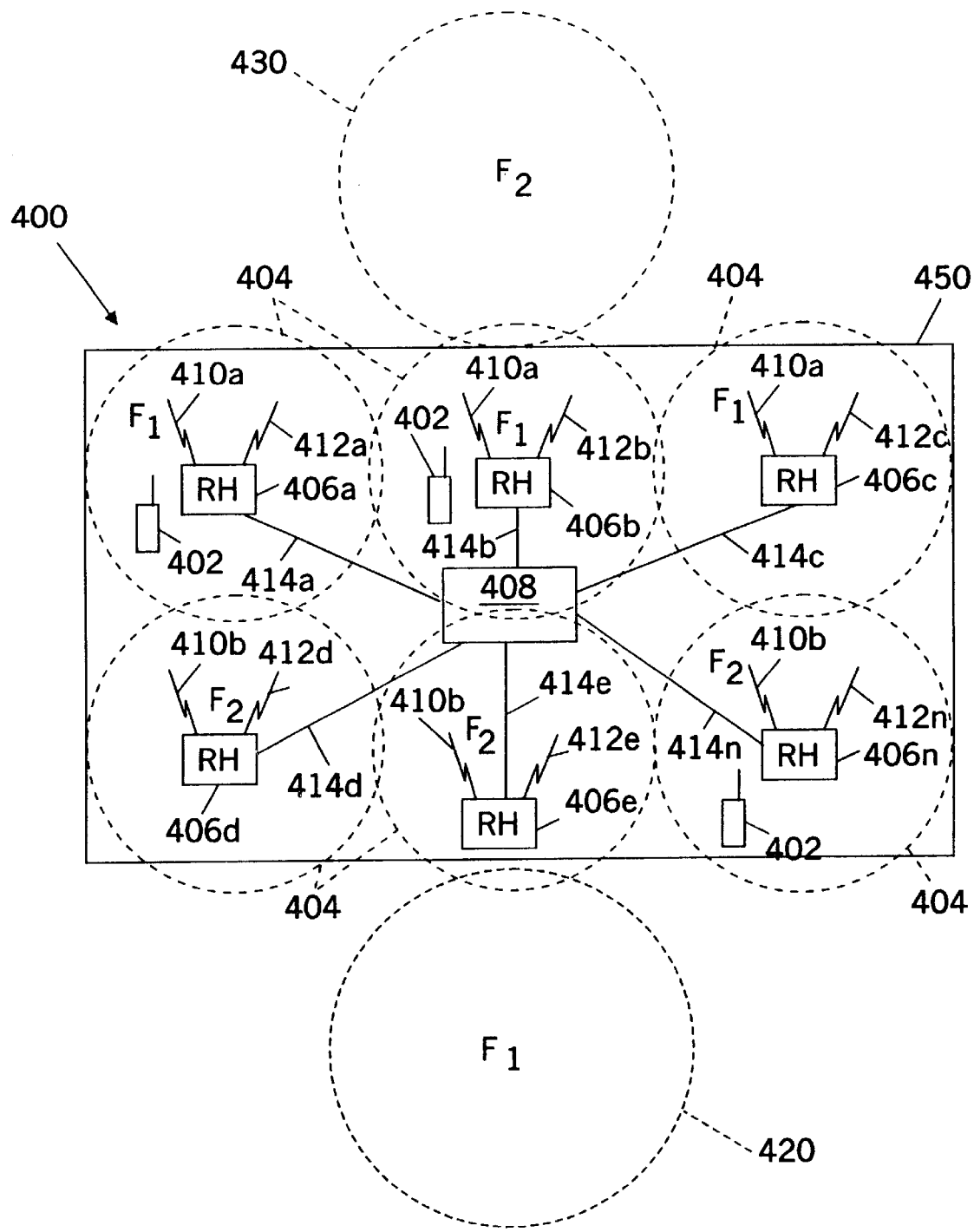
FIG. 4 is a block diagram of second embodiments of cellular radiotelephone communication systems and methods according to the present invention.

Referring now to FIG. 4, a second embodiment of cellular radiotelephone systems and methods according to the invention will now be described. More specifically, FIG. 4 illustrates cellular radiotelephone systems and methods that are adapted for use in a building in a Wireless Office System (WOS), also referred to as Digital Wireless Office System (DWOS). In a WOS, a plurality of cellular base stations, referred to herein as "radio heads" (RH) 406*a*–406*n* are installed on a floor 450 of a building to provide a plurality of cells 404. Although FIG. 4 illustrates a plan view of a single floor 450 in a building, it will be understood that the WOS may extend over multiple floors or over only part of a floor of a building. On a floor 450, a plurality of radio heads 406*a*–406*n* are connected to a Cellular Radio Exchange (CRE) 408, which provides the functions of a Mobile Telephone Switching Office (MTSO) and may also provide other functions. Although CRE 408 is indicated as being on the same floor 450, it may be installed remotely. The CRE 408 may include a central control channel handler. The CRE 408 is linked to the radio heads 406*a*–406*n* by a plurality of radio frequency or wire links 414*a*–414*n*. A plurality of radiotelephones 402 are also located on the floor 450 and communicate with the radio heads 406*a*–406*n* using a plurality of radiotelephone traffic channels 412*a*–412*n*.

Still referring to FIG. 4, the building in which the cellular radiotelephone system 400 is installed may be subject to interference by a cellular radiotelephone system that is outside the building. More specifically, as shown in FIG. 4, a cell 420 from an outside cellular radiotelephone system may include a control channel on radio frequency $F_1$ and a cell 430 from an outside cellular radiotelephone system may include a control channel on radio frequency $F_2$.

According to the invention, the common control channel is transmitted on more than one radio frequency to reduce and preferably eliminate interference. Thus, the common control channel is synchronously transmitted by all of the radio heads 406*a*–406*n*. However, the common control channel 410*a* from base stations 406*a*–406*c* utilize radio frequency $F_1$, so that the walls of the building between cell 420 and radio heads 406*a*–406*c* and/or the distance from cell 420 can attenuate radio frequency $F_1$ sufficiently to reduce or preferably eliminate interference with these radio heads. Similarly, radio heads 406*d*–406*n* transmit the control channel 401*b* using radio frequency $F_2$, so that interference with cell 430 can be reduced and preferably minimized due to attenuation by distance and/or the walls of the building. Accordingly, a common control channel is used by all of the radio heads, to thereby reduce excess capacity in the control channels. At least two radio frequencies are used to broadcast the common control channel, to thereby reduce and preferably minimize interference.

More specifically, in a WOS of up to 450 users, one control channel may be enough for the entire WOS. The common control channel is broadcast by the radio heads, to provide coverage in the whole system. The intelligence of the control channel may be located in the CRE 408. Control channel downlink information from the base stations to the mobile radiotelephones 402 is multicast from the CRE 408 via all of the base stations 406*a*–406*n*, over the common control channel. In this way, all radiotelephones within the building can decode all information in the downlink.

Control channel uplink information from the radiotelephones is detected by the radio heads 406*a*–406*n*. The information is translated to baseband and forwarded to the CRE 408. It will be understood that the radio head closest to the mobile radiotelephone will generally receive the strongest radio signal, while more distant radio heads may receive a weaker signal or not receive a radio signal from the mobile radiotelephone at all. Since the intelligent part of the control channel is preferably located in the CRE, the uplink information may be forwarded from all radio heads to the CRE. The CRE can then use a diversity detector, to select the radio head with the best signal received from the mobile radiotelephone. Thus, the WOS can communicate with the mobiles on the digital control channel without having to know which radio head is closest to the mobile radiotelephone. The result of the diversity detector may also be stored and used by the WOS to choose which radio head to allocate to a mobile radiotelephone if a traffic channel is to be set up.

Since the WOS uses the same frequency band as the outdoor cellular system, it may be difficult for the WOS to find unused frequencies and allocate the best frequency to the control channel. This can be especially difficult in high-rise buildings with line of site to many outdoor base stations and interference from other wireless office systems in the high-rise building.

According to the invention, different control frequencies may be allocated on different sides of the floor. In other words, some of the radio heads may be retuned to another frequency. This retuning need not change the WOS architecture except for frequency tuning of at least one of the radio heads. Frequency tuning may be performed manually or by sending a tuning message to the appropriate radio head(s). The CRE can still use the same multicast scheme in the downlink and the same diversity detector in the uplink. Accordingly, all control channel data in the downlink and uplink directions may be the same. Moreover, the radiotelephones themselves need not be modified. In order to set the Coded Digital control channel Locator Bits (CDL) properly on digital traffic channels, the CDL bits may be stored by each radio head to reflect the correct control channel frequency for that radio head.

Figure 1:
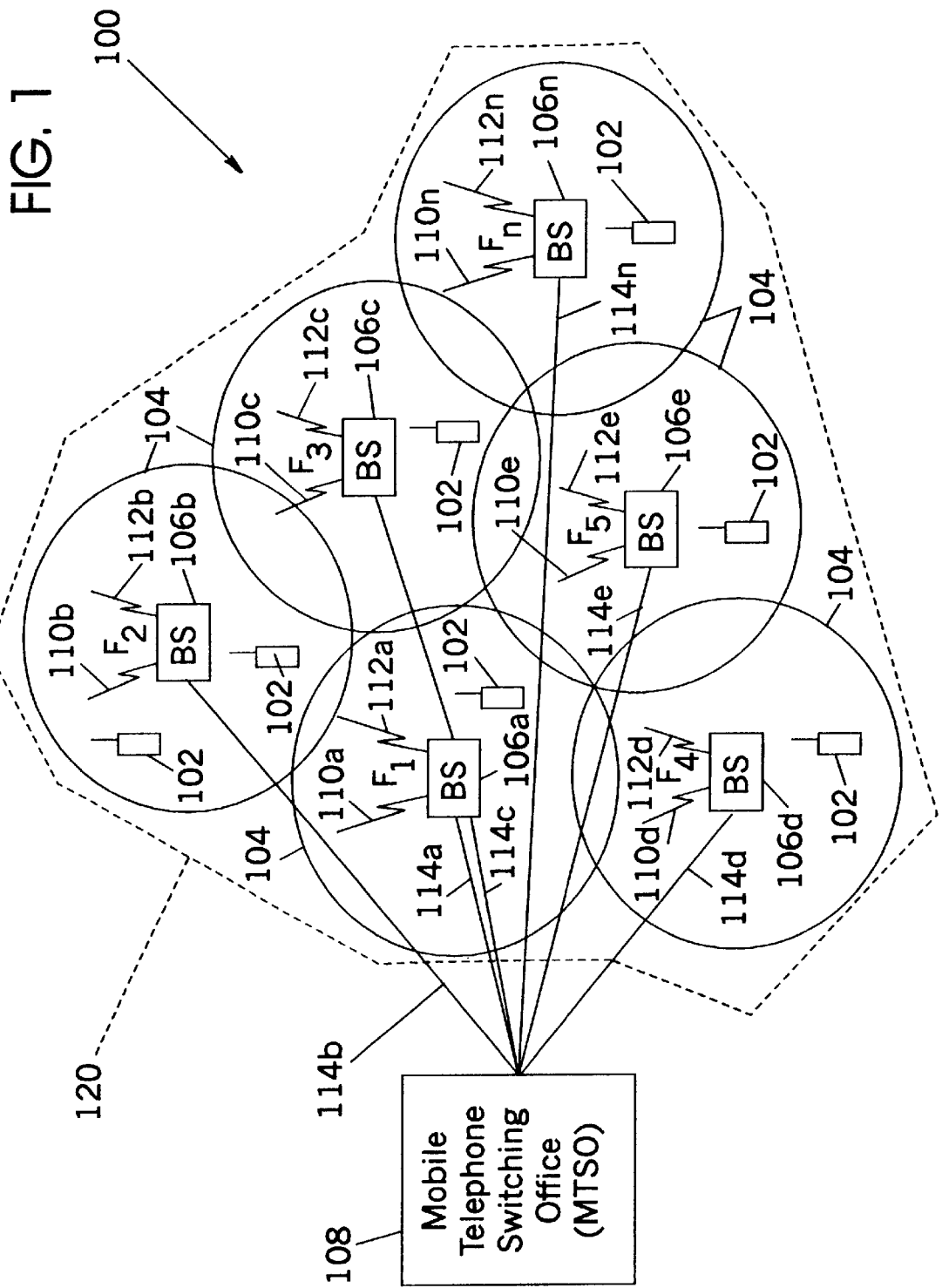
FIG. 1 is a block diagram of a conventional cellular telephone communication system.
Figure 2:
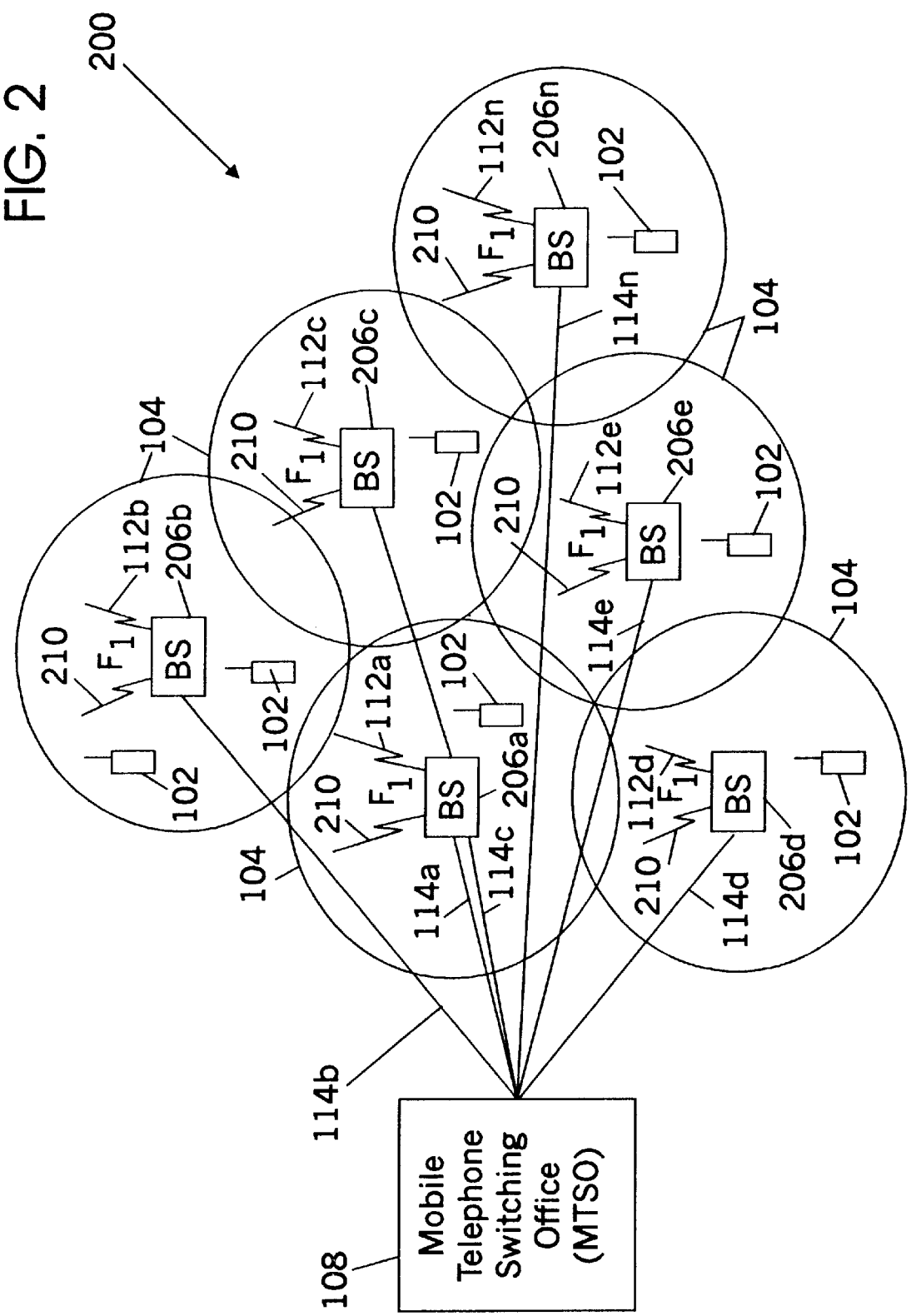
FIG. 2 is a block diagram of a conventional cellular radiotelephone system using a common control channel.
Figure 5:
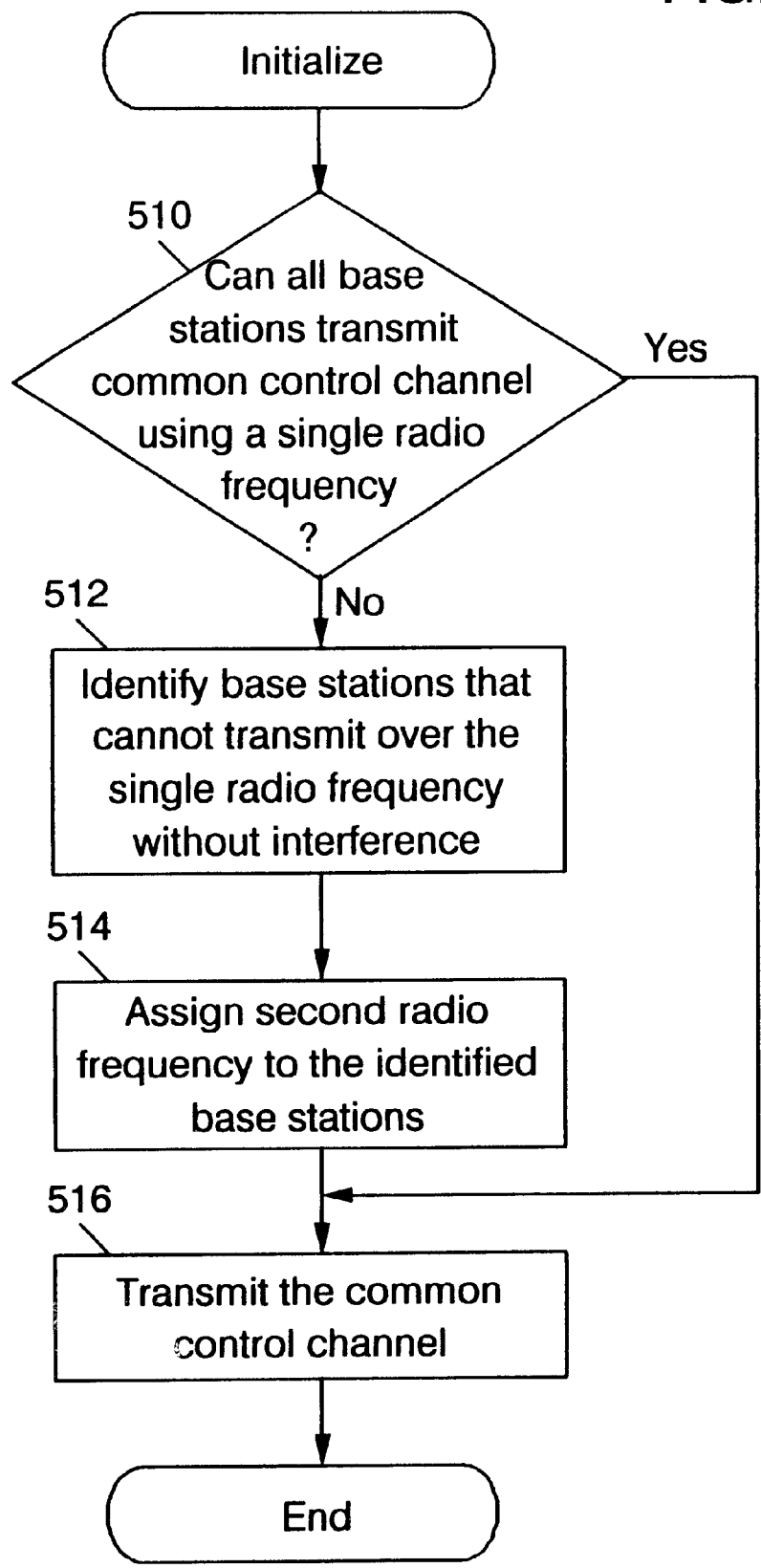
FIG. 5 illustrates initialization of cellular radiotelephone systems according to the present invention.

Referring now to FIG. 5, operations for initializing a cellular radiotelephone system according to the present invention will now be described. As shown in Block 510, a determination is made as to whether the common control channel can be transmitted from all of the base stations over a first radio frequency without interference. If this is the case, then the configuration of FIG. 2 may be used wherein a common control channel is transmitted by all of the base stations using a single radio frequency. The common control channel is transmitted at Block 516.

Alternatively, if all of the base stations cannot transmit the common control channel using a single radio frequency at Block 510, then at Block 512 the base stations that cannot transmit on the single radio frequency without interference are identified. A second radio frequency is assigned to the identified base stations at Block 514. Then, at Block 516, each of the base stations transmits the common control channel using the assigned frequency.

It will be understood by those having skill in the art that the operations of Block 510 can be repeatedly performed using all available radio frequencies in order to determine whether any single radio frequency can be used by all of the base stations to transmit the common control channel. Moreover, it will also be understood that the operations of Block 510, 512 and 514 may be repeatedly performed if no two radio frequencies can be used by all the base stations to transmit the common control channel. Thus, three or more radio frequencies may be used in order to allow the common control channel to be transmitted by all the base stations without interference.

Accordingly, a common control channel may be used by multiple base stations, to thereby reduce and preferably eliminate excess control channel capacity. Two or more radio frequencies may be used to synchronously transmit the common control channel, to thereby reduce and preferably eliminate interference. Efficient, high performance cellular radiotelephone systems and methods may thereby be provided.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A cellular radiotelephone system that communicates with a plurality of cellular radiotelephones, comprising:
    a plurality of base stations;
    a plurality of radiotelephone traffic channels that are used by the base stations for radiotelephone communications with the radiotelephones; and
    a common control channel that is transmitted synchronously by the base stations to control radiotelephone communications with the radiotelephones over the radiotelephone traffic channels, wherein the common control channel transmits the same information by the base stations; and
    the common control channel being transmitted by a first one of the base stations over a first radio frequency, and being transmitted by a second one of the base stations over a second radio frequency that is different from the first radio frequency.

2. A cellular radiotelephone system according to claim 1:
    wherein the plurality of base stations are Wireless Office System (WOS) base stations that are located in a building to provide cellular radiotelephone communication among cellular radiotelephones that are located in the building;
    wherein the common control channel is transmitted by the base stations in the building to control radiotelephone communications with the radiotelephones in the building over the radiotelephone traffic channels; and
    wherein the common control channel is transmitted by the first one of the base stations in the building over a first radio frequency, and is transmitted by the second one of the base stations in the building over a second radio frequency that is different from the first radio frequency.

3. A cellular radiotelephone system according to claim 2:
    wherein at least two of the base stations in the building receive control channel communications from one of the radiotelephones in the building over the common control channel;
    the cellular radiotelephone system further comprising a diversity detector that identifies a strongest one of the control channel communications that are received by the at least two of the base stations in the building.

4. A cellular radiotelephone system according to claim 3 further comprising a controller that allocates a radiotelephone traffic channel for communication with the one of the radiotelephones in the building based upon the identified strongest one of the control channel communications that are received by the at least two of the base stations in the building.

5. A cellular radiotelephone system according to claim 1:
    wherein the common control channel is transmitted by a first group of the base stations over the first radio frequency; and
    wherein the common control channel is transmitted by a second group of the base stations over the second radio frequency.

6. A cellular radiotelephone system according to claim 5 wherein the first group of base stations is located in a first portion of a building and wherein the second group of base stations is located in a second portion of a building.

7. A cellular radiotelephone system according to claim 1:
    wherein at least two of the base stations receive control channel communications from one of the radiotelephones over the common control channel;
    the cellular radiotelephone system further comprising a diversity detector that identifies a strongest one of the control channel communications that are received by the at least two of the base stations.

8. A cellular radiotelephone system according to claim 7 further comprising a controller that allocates a radiotelephone traffic channel for communication with the one of the radiotelephones based upon the identified strongest one of the control channel communications that are received by the at least two of the base stations.

9. A cellular radiotelephone system according to claim 1 further comprising a central control channel handler that synchronously transmits the common control channel to the plurality of base stations.

10. A cellular radiotelephone system that communicates with a plurality of cellular radiotelephones, comprising:
    a plurality of base stations;
    a plurality of radiotelephone traffic channels that are used by the base stations for radiotelephone communications with the radiotelephones;
    a common control channel that is transmitted synchronously by the base stations to control radiotelephone communications with the radiotelephones over the radiotelephone traffic channels, wherein the common control channel transmits the same information by the base stations;

a first one of the base stations comprising means for transmitting the common control channel over a first radio frequency; and a second one of the base stations comprising means for transmitting the common control channel over a second radio frequency that is different from the first radio frequency.

11. A cellular radiotelephone system according to claim 10:

wherein the plurality of base stations are Wireless Office System (WOS) base stations that are located in a building to provide cellular radiotelephone communication among cellular radiotelephones that are located in the building;

wherein the common control channel is transmitted by the base stations in the building to control radiotelephone communications with the radiotelephones in the building over the radiotelephone traffic channels;

wherein the first one of the base stations comprises means for transmitting the common control channel in the building over a first radio frequency; and wherein the second one of the base stations comprises means for transmitting the common control channel in the building over a second radio frequency that is different from the first radio frequency.

12. A cellular radiotelephone system according to claim 11:

wherein at least two of the base stations in the building receive control channel communications from one of the radiotelephones in the building over the common control channel;

the cellular radiotelephone system further comprising means for identifying a strongest one of the control channel communications that are received by the at least two of the base stations in the building.

13. A cellular radiotelephone system according to claim 12 further comprising means for allocating a radiotelephone traffic channel for communication with the one of the radiotelephones in the building in response to the means for identifying a strongest one of the control channel communications that are received by the at least two of the base stations in the building.

14. A cellular radiotelephone system according to claim 10:

wherein a first group of the base stations each comprises means for transmitting the common control channel over the first radio frequency; and wherein a second group of the base stations each comprises means for transmitting the common control channel over the second radio frequency.

15. A cellular radiotelephone system according to claim 14 wherein the first group of base stations is located in a first portion of a building and wherein the second group of base stations is located in a second portion of a building.

16. A cellular radiotelephone system according to claim 10:

wherein at least two of the base stations receive control channel communications from one of the radiotelephones over the common control channel;

the cellular radiotelephone system further comprising means for identifying a strongest one of the control channel communications that are received by the at least two of the base stations.

17. A cellular radiotelephone system according to claim 16 further comprising means for allocating a radiotelephone traffic channel for communication with the one of the radiotelephones in response to the means for identifying a strongest one of the control channel communications that are received by the at least two of the base stations.

18. A cellular radiotelephone system according to claim 10 further comprising means for synchronously transmitting the common control channel to the plurality of base stations.

19. A method of controlling a cellular radiotelephone system including a plurality of radiotelephone traffic channels that are used by a plurality of base stations for radiotelephone communications with a plurality of radiotelephones, using a common control channel that is transmitted synchronously by the base stations to control radiotelephone communications with the radiotelephones over the radiotelephone traffic channels, wherein the common control channel transmits the same information by the base stations, the method comprising the steps of:

transmitting the common control channel from a first one of the base stations over a first radio frequency; and transmitting the common control channel from a second one of the base stations over a second radio frequency that is different from the first radio frequency.

20. A method according to claim 19:

wherein the plurality of base stations are Wireless Office System (WOS) base stations that are located in a building to provide cellular radiotelephone communication among cellular radiotelephones that are located in the building and wherein the common control channel is transmitted by the base stations in the building to control radiotelephone communications with the radiotelephones in the building over the radiotelephone traffic channels;

wherein the step of transmitting the common control channel from a first one of the base stations over a first radio frequency comprises the step of transmitting the common control channel from the first one of the base stations in the building over the first radio frequency; and wherein the step of transmitting the common control channel from a second one of the base stations over a second radio frequency comprises the step of transmitting the common control channel from the second one of the base stations in the building over the second radio frequency that is different from the first radio frequency.

21. A method according to claim 20 further comprising the steps of:

receiving control channel communications from one of the radiotelephones in the building over the common control channel at at least two of the base stations in the building; and identifying a strongest one of the control channel communications that are received by the at least two of the base stations in the building.

22. A method according to claim 21 further comprising the step of:

allocating a radiotelephone traffic channel for communication with the one of the radiotelephones in the building in response to the step of identifying a strongest one of the control channel communications that are received by the at least two of the base stations in the building.

23. A method according to claim 19:

wherein the step of transmitting the common control channel from a first one of the base stations over a first radio frequency comprises the step of transmitting the common control channel from a first group of base stations over the first radio frequency; and wherein the step of transmitting the common control channel from second one of the base stations comprises the step of transmitting the common control channel from a second group of base stations over the second frequency.

24. A method according to claim 23 wherein the first group of base stations is located in a first portion of a building and wherein the second group of base stations is located in a second portion of a building.

25. A method according to claim 19 further comprising the steps of:

receiving control channel communications from one of the radiotelephones over the common control channel at at least two of the base stations; and identifying a strongest one of the control channel communications that are received by the at least two of the base stations.

26. A method according to claim 25 further comprising the step of:

allocating a radiotelephone traffic channel for communication with the one of the radiotelephones in response to the step of identifying a strongest one of the control channel communications that are received by the at least two of the base stations.

27. A method according to claim 19 further comprising the step of synchronously transmitting the common control channel to the plurality of base stations.

28. A method of initializing a cellular radiotelephone system including a plurality of radiotelephone traffic channels that are used by a plurality of base stations for radiotelephone communications with a plurality of radiotelephones, using a common control channel that is transmitted by the base stations to control radiotelephone communications with the radiotelephones over the radiotelephone traffic channels, wherein the common control channel transmits the same information by the base stations, the method comprising the steps of:

determining whether the common control channel can be transmitted from the plurality of base stations over a first radio frequency without interference;

if the common control channel cannot be transmitted from the plurality of base stations over the first radio frequency without interference, identifying at least one of the base stations that cannot transmit the common control channel over the first radio frequency without interference; and assigning a second radio frequency that is different from the first radio frequency for transmission of the common control channel by the at least one of the base stations so identified.

29. A method according to claim 28 further comprising the steps of:

transmitting the common control channel from the plurality of base stations except for the at least one of the base stations so identified over the first radio frequency; and transmitting the common control channel from the at least one of the base stations so identified over the second radio frequency that is different from the first radio frequency.

30. A method according to claim 29:

wherein the plurality of base stations are Wireless Office System (WOS) base stations that are located in a building to provide cellular radiotelephone communication among cellular radiotelephones that are located in the building and wherein the common control channel is transmitted by the base stations in the building to control radiotelephone communications with the radiotelephones in the building over the radiotelephone traffic channels;

wherein the step of transmitting the common control channel from the plurality of base stations except for the at least one of the base stations so identified over a first radio frequency comprises the step of transmitting the common control channel from the plurality of base stations in the building over the first radio frequency except for the at least one of the base stations so identified; and wherein the step of transmitting the common control channel from the at least one of the base stations so identified over a second radio frequency that is different from the first radio frequency comprises the step of transmitting the common control channel from the at least one of the base stations so identified in the building over the second radio frequency that is different from the first radio frequency.

31. A method according to claim 30 further comprising the steps of:

receiving control channel communications from one of the radiotelephones in the building over the common control channel at at least two of the base stations in the building; and identifying a strongest one of the control channel communications that are received by the at least two of the base stations in the building.

32. A method according to claim 31 further comprising the step of:

allocating a radiotelephone traffic channel for communication with the one of the radiotelephones in the building in response to the step of identifying a strongest one of the control channel communications that are received by the at least two of the base stations in the building.

33. A method according to claim 29 further comprising the steps of:

receiving control channel communications from one of the radiotelephones over the common control channel at at least two of the base stations; and identifying a strongest one of the control channel communications that are received by the at least two of the base stations.

34. A method according to claim 33 further comprising the step of:

allocating a radiotelephone traffic channel for communication with the one of the radiotelephones in response to the step of identifying a strongest one of the control channel communications that are received by the at least two of the base stations.

35. A method according to claim 28 wherein the steps of determining, identifying and assigning are repeatedly performed for the second radio frequency and succeeding radio frequencies until all of the base stations can transmit the common control signal without interference.

36. A method according to claim 28 further comprising the step of synchronously transmitting the common control channel to the plurality of base stations.

* * * * *